Nov. 6, 1956 F. B. PFEIFFER 2,769,522
CONVEYOR AND STRETCHING MEANS
Filed Feb. 3, 1954 5 Sheets-Sheet 1
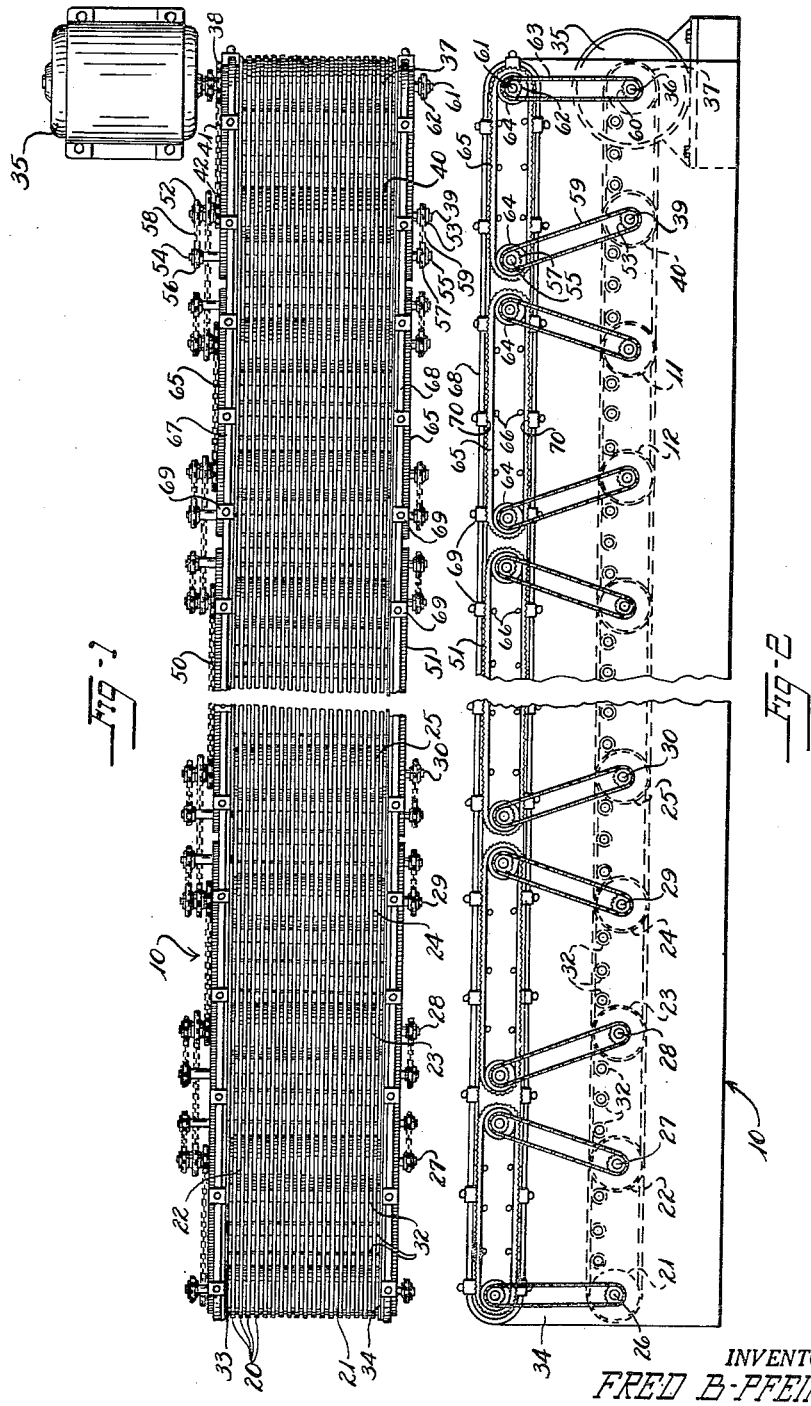
INVENTOR.
FRED B. PFEIFFER
BY
ATTY.

Nov. 6, 1956 F. B. PFEIFFER 2,769,522
CONVEYOR AND STRETCHING MEANS
Filed Feb. 3, 1954 5 Sheets-Sheet 2
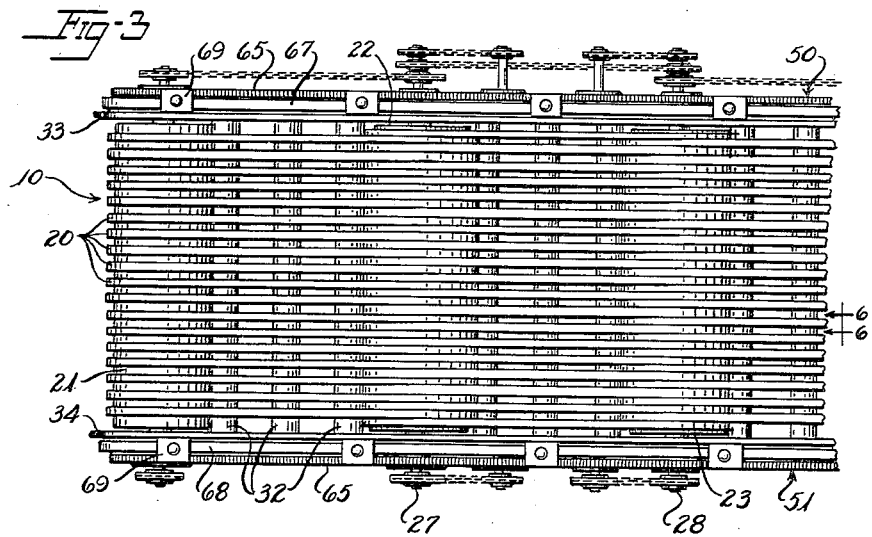
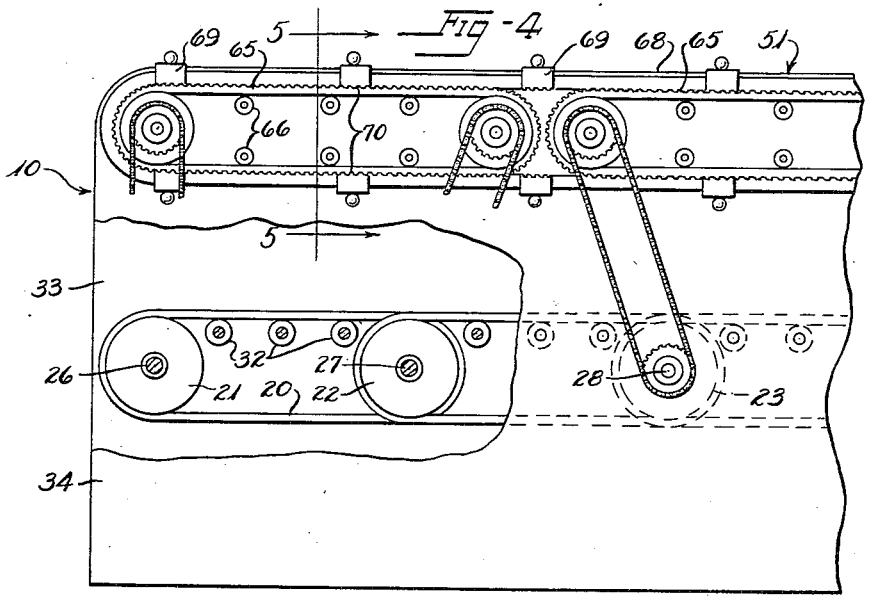
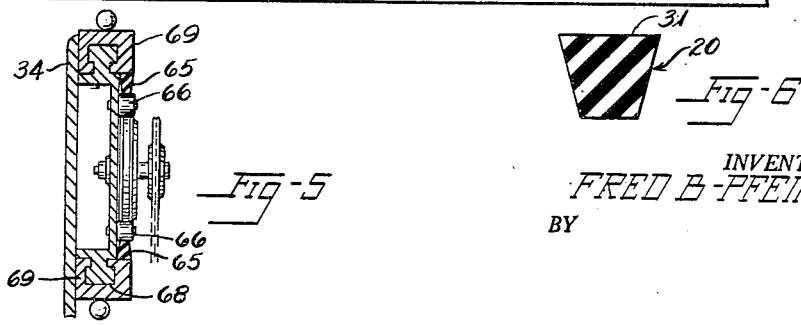
INVENTOR.
FRED B. PFEIFFER
BY
ATTY.

Nov. 6, 1956
F. B. PFEIFFER
2,769,522
CONVEYOR AND STRETCHING MEANS
Filed Feb. 3, 1954
5 Sheets-Sheet 3
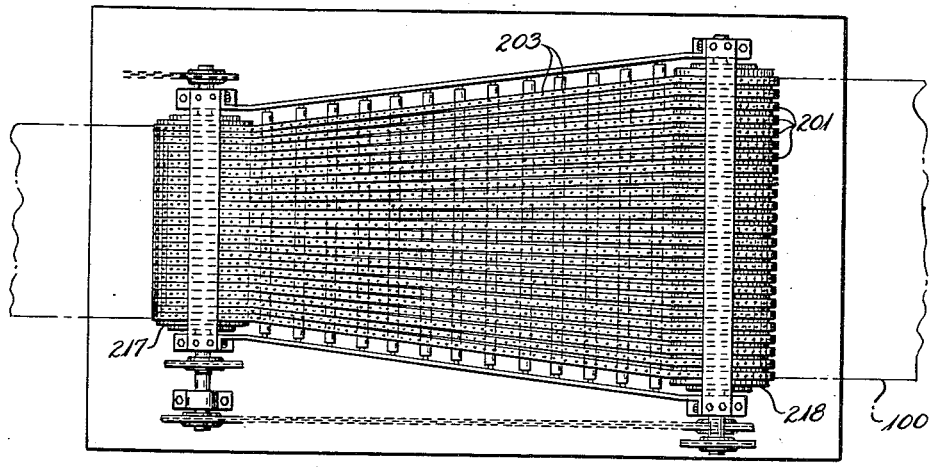
Fig-7
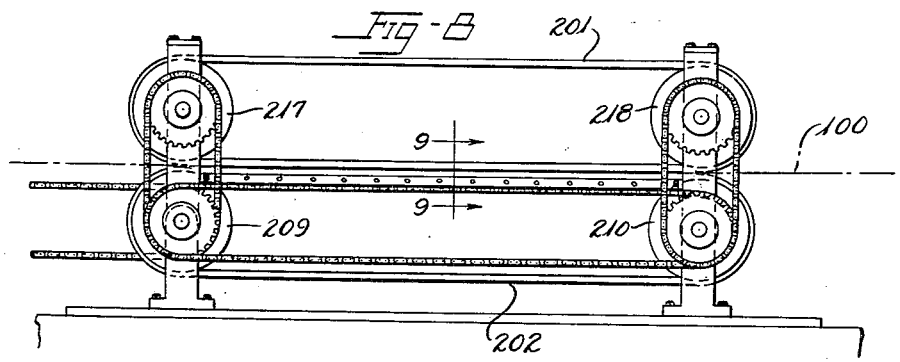
Fig-8
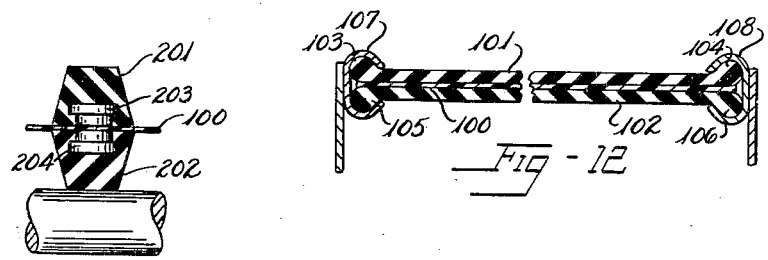
Fig-9
Fig-12
INVENTOR.
FRED B. PFEIFFER
BY
ATTY.

Nov. 6, 1956 F. B. PFEIFFER 2,769,522
CONVEYOR AND STRETCHING MEANS
Filed Feb. 3, 1954 5 Sheets-Sheet 4

INVENTOR.
FRED B. PFEIFFER
BY

ATTY-

Nov. 6, 1956  F. B. PFEIFFER  2,769,522
CONVEYOR AND STRETCHING MEANS
Filed Feb. 3, 1954  5 Sheets-Sheet 5
Fig-15
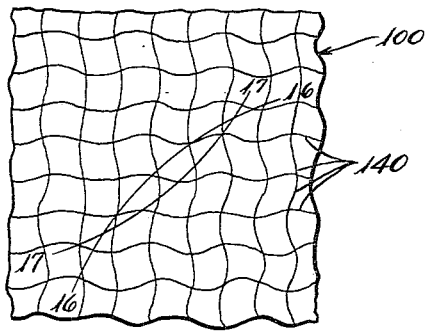
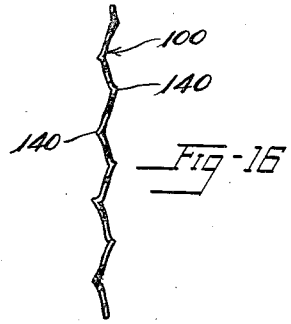
Fig-16
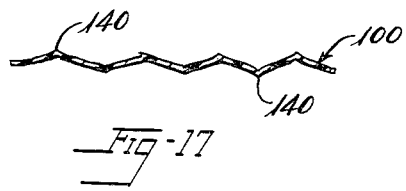
Fig-17
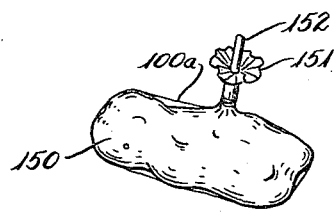
Fig-18
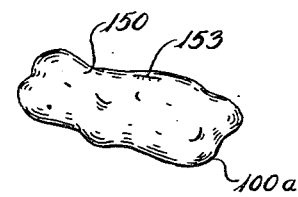
Fig-19
INVENTOR.
FRED B. PFEIFFER
BY
ATTY.

United States Patent Office 2,769,522
Patented Nov. 6, 1956

2,769,522

CONVEYOR AND STRETCHING MEANS

Fred B. Pfeiffer, Akron, Ohio

Application February 3, 1954, Serial No. 407,900

4 Claims. (Cl. 198—34)

This invention relates to conveying and stretching means, one embodiment of which comprises an endless conveyor belt that simultaneously increases and decreases in the speed of its travel in its forward and return directions respectively, whereby people or objects may be conveyed at a predetermined rate of increase or decrease of speed. Another embodiment of the invention comprises an endless conveyor belt-like means that simultaneously increases and decreases the speed of its travel in opposite directions respectively, and simultaneously widens and narrows in different portions of the same belt.

It has been proposed to provide conveyor belts to transport people from one station to another in cities where traffic is congested. Such installations as have been proposed provide for a slow travel of the conveyor belt, such as, for example, a speed of one and a half to two miles per hour. Applicant's invention provides convenient, safe and relatively inexpensive loading and unloading means for conveyors which make practical loading and unloading such transport conveyor belts up to any speed such belts may be run without their premature failure.

Before the present invention, methods and apparatus for stretching films of rubber hydrochloride and the like have been developed as will be seen by reference to United States patents, R. C. Martin No. 2,328,827; H. D. Minch Nos. 2,307,056 and 2,334,022. In Patent No. 2,334,022, page 2, column 2, lines 15 to 25 it is stated that the film may be stretched laterally and that it may be possible to stretch it longitudinally and laterally at the same time, however, neither the specifications nor drawing of this latter patent describes or shows means for or discloses the disadvantages of such simultaneous two-way stretch.

So far as applicant has been able to learn the prior art methods and apparatus, for stretching sheets of heat softened rubber hydrochloride or other thermostretchable elastoplastic sheets, whether for orienting the material or to increase the surface area thereof, has not been completely satisfactory principally because such stretching has been done entirely from the edges in the width wide stretching. These films adapted for packaging are usually about .001" in thickness and whether cast or calendered, their thickness varies, and probably due to lack of uniform dispersion of plasticizers, the film has areas more easily stretched than other areas. When the stretching force is applied at the edge of the sheet or strip, or across a substantial distance of film in any direction these thin and soft spots are stretched an objectionable amount while the thicker and the harder areas are not stretched as much as is desirable resulting in an extremely non-uniform sheet. Applicant's method employs stretching means, which means is itself stretchable and in direct contact with the surface of the portion of the film being stretched or wrinkled as the case may be.

An object of the present invention is to utilize the above stated characteristics of said conveyor belts as loading and unloading means for transportation conveyor belts which, for example, but without limitation, may be used to transport people in a city transportation system.

Another object of the present invention is to provide means for increasing the surface area by simultaneously stretching sheets of stretchable material in all directions in such manner that thin, soft, weak or tough portions of the sheet is subjected to the same uniform amount of stretch.

Another object of the invention is to simultaneously wrinkle, in all directions, a relatively thin sheet of material.

Another object of the present invention is to convert a thin smooth sheet or strip of rubber hydrochloride, hydrobromide or the like, into an oriented sheet with its surface having numerous wrinkles extending in all directions and being adapted to enclose an object to be packaged by being drawn snugly thereabout straightening out at least some of said wrinkles, and if desired, next subjecting the film to heat to cause the film to shrink, removing additional wrinkles and to cause the film to fit smoothly about said object.

In the accompanying drawings which are more or less diagrammatic:

Fig. 1 is a plan view of apparatus which may be used for loading or unloading persons onto or from a rapidly moving conveyor belt or other conveyance such as a subway train;

Fig. 2 is a side elevation of the apparatus shown in Fig. 1;

Fig. 3 is an enlarged fragmentary view of Fig. 1;

Fig. 4 is a side elevation of Fig. 2;

Fig. 5 is a sectional view taken on line 5—5 of Fig. 4;

Fig. 6 is a view taken on line 6—6 of Fig. 3;

Fig. 7 is a plan view of another embodiment of the invention and adapted to convey and stretch and wrinkle a sheet of material;

Fig. 8 is a side elevation of the apparatus of Fig. 7;

Fig. 9 is an enlarged fragmentary sectional view taken on line 9—9 of Fig. 8;

Fig. 12 is a sectional view taken on line 12—12 of Fig. 11;

Fig. 15 is an enlarged plan view of a small area of the film of Fig. 8 shown after the film has been stretched in the apparatus of Fig. 7, cooled and wrinkled by running the unstretched film through the apparatus of Fig. 8 in reverse direction;

Figure 10:
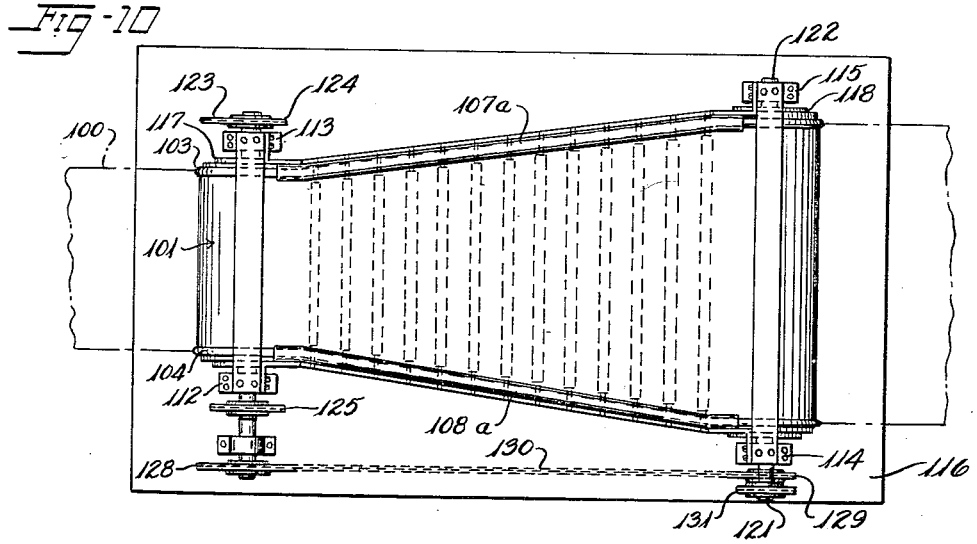
Fig. 10 is a plan view of another embodiment of the invention adapted for conveying and stretching and wrinkling sheet material.

Figs. 16 and 17 are sectional views of the film of Fig. 15 taken on line 16—16 and 17—17 respectively;

Fig. 18 is a perspective view of an article of irregular shape enclosed in a sheet of the film of Fig. 15 with the edges of the sheet gathered or twisted about a tube which communicates with the space between said article and the wrapper film; and Fig. 19 is the same as Fig. 18 but showing the film in close association with the entire surface of the wrapped article.

Referring now to the drawings in detail, it will be seen by reference to Figs. 1, 2 and 6 that the loading and unloading conveyor referred to generally as 10 comprises successive series of parallel endless rubber V belts 20 mounted on spaced parallel drums 21, 22, 23, 24, 25 which drums are in turn mounted on shafts 26, 27, 28, 29, 30 respectively. Said drums have V grooves or sheaves in which said belts run and except on the end drums of conveyor 10 each drum has mounted thereon the belts of the next successive series of belts, the belts of one series being disposed alternately on their common drum with those of said next successive series.

Figure 13:
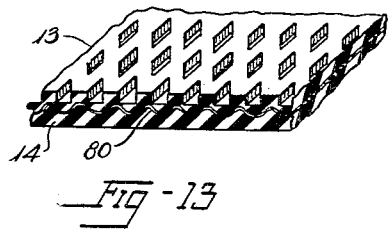
Fig. 13 is an enlarged fragmentary perspective view partly in section of a modification of the belt shown in Fig. 6, the same being shown in unstretched condition.
Figure 14:
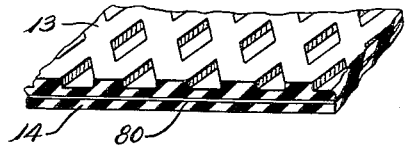
Fig. 14 is the same as Fig. 13 except the belt is shown in stretched condition.

Belts 20, as will be seen by reference to Fig. 6, have a flat top 31 and preferably are approximately ½" wide at their top. The sheaves of said drums are closely spaced longitudinally of the drums so that the open space between belts 20 between the drums will be approximately equal to the width of the top of a said belt. The close spacing of belts 20 is to provide safe and comfortable support for persons standing on and being conveyed by the belts. Belts 20 may be composed of all rubber or rubber-like material and supported by idler rollers 32, or they may be constructed as illustrated in Figs. 13 and 14. In any event, belts 20 are stretchable and elastic.

The said drums are supported on their shafts and the shafts journalled in suitable bearings in journal boxes mounted in vertical side supports 33 and 34, said bearings and journal boxes not being identified or shown in the drawings as they are of any conventional type and are not claimed as an element of the invention.

The driving of belts 20 is initiated by a motor 35 connected directly to a shaft 36 of an end drum 37. A sprocket wheel 38 is driven by shaft 36 and a shaft 39 of a drum 40 is driven by sprocket chain 41 running from sprocket wheel 38 to a sprocket wheel 42 on shaft 39 as will be seen by reference to Fig. 1. In similar manner, the successive drums of conveyor 10 are driven as will also be seen by reference to the drawings. Platforms on which passengers may step when getting on and off conveyor 10 may be disposed at each end of the conveyor as convenience and safety dictates. Such a platform will be necessary for persons when stepping from the loading conveyor 10 onto or off the end of said transport conveyor as would be necessary in the event conveyor 10 is aligned with the transport conveyor as will be understood as the description continues.

The sprocket chain drive of said drums is so designed that each succeeding drum from the left end drum 21 to right end drum 37 is driven at a surface speed greater than the next preceding drum. Thus the portions of belts 20 in contact with drum 21 travel at a speed of 1 mile per hour while the portions of the same belts 20 that are in contact with drum 22 travel at a speed of 2 miles per hour or twice as fast as on drum 21. The root diameter of the sheaves in the drums may be 30" and the distance from axis to axis of said drums may be 10 feet. Acceleration of belts 20 between drums 21 and 22 as explained above accrues progressively through the portion of said belts traveling from drum 21 to 22 and such acceleration is made possible by the elastic nature of said belts. In operation a person stepping on conveyor 10 at left end thereof will immediately be conveyed at a speed of 1 mile per hour and will be conveyed at gradually increased speed arriving over drum 22 traveling at 2 miles per hour where his shoes will come into contact with belts 20 extending between drums 22 and 23. Since belts 20 are narrow and separated on drum 22 by the width of one such belt, no uncomfortable feeling will be sensed by said person as he is conveyed from one series of belts 20 to another series thereof since any two series of belts are traveling at the same speed on any common drum. The sprocket drives between drums 22 and 23 provide the same acceleration of belt travel. Thus said person will start over drum 22 at 2 miles per hour and arrive over drum 23 at 3 miles per hour and at each succeeding drum at an increased speed of 1 mile per hour arriving at the right end of conveyor 10 at a speed equal to the number of series of belts times the rate of acceleration of travel of the succeeding series. If there are 10 such series of belts and the first accelerates from 1 mile per hour to 2 miles per hour and the other nine series have a similar acceleration said person would be traveling at 11 miles per hour. Where rubber belts 20 are used the rate of acceleration may be increased over that described above up to the breaking point of the rubber. The greater the distance between the axis of said drums the more gradual will the increase of speed occur. Obviously the invention may be varied greatly as for example, one long belt may be substituted for the numerous series of belts 20 and the acceleration may be increased or decreased all as found desirable for the immediate work the conveyor is required to do.

As a matter of safety and convenience, for persons standing on the traveling conveyor 10, moving hand rails 50, 51, which function in a similar manner as well known rails for escalators, are provided. To this end shaft 39 is extended beyond sprocket wheel 42 with a sprocket wheel 52 fixedly mounted on its extension as shown in Fig. 1. The end of shaft 39 opposite its said extended end has mounted thereon a sprocket wheel 53. Spindles 54 and 55 mounted on sides 34 and 33 have mounted thereon sprocket wheels 56 and 57 respectively, with sprocket chains 58 and 59 on sprocket wheels 56 and 57 respectively. Shaft 36 carries sprocket wheel 60 and a spindle 61 is mounted on side 33 directly above shaft 36. Spindle 61 carries a sprocket wheel 62 and a sprocket chain 63 is mounted on wheels 60 and 62. A similar construction to that of wheels 60, 62, spindle 61 and chain 63 are disposed at the opposite end of shaft 36, members 60, 62, 61 and 63 not being shown in the drawings. Sheaves 64 are mounted on said spindles and relatively short endless V belts 65 with cogs on their outer surface are mounted on and driven by said sheaves. Belts 65 are supported against sagging by idler rollers 66 carried on spindles extending from sides 33 and 34. Continuous rails 67 and 68 extend the length of conveyor 10 as illustrated, said rails having mounted thereon in slidable relation therewith hand grips 69. Grips 69 have a cog surface 70 which surface is adapted to mesh with the cogs on belts 65 and to slide the grips along said rails. It will be noted by reference to Fig. 5 that said rails are attached by any means found satisfactory, as by nailing, to a said side. The ends of the several belts 65 are spaced apart a short distance leaving a space across which hand grips 69 must travel free of their meshed contact with belts 65. It is to be understood that the hand grips may be connected by flexible means such as a rope or small chain, however, such connection is considered unnecessary since persons being conveyed will usually have their hand on a grip 69 which will slide the grip on the rail across the space between the ends of belts 65. If the hand grips are left free then the oncoming grips will push preceding ones over said spaces and only poor distribution of the grips along said rails will result.

In operation, when used to load people on a transportation conveyor belt traveling, for example, 15 miles per hour, conveyor belt 10 is preferably aligned with such transportation conveyor with the ends of the two conveyors close together. If desired, a short intermediate conveyor belt running on pulleys or drums of small diameter may be installed between conveyor 10 and said transportation belt, the ends of said intermediate conveyor can be disposed in substantially abutting relation to the ends of the other conveyors and in the present example run at a speed of 15 miles per hour which is the speed the discharging end of conveyor 10 and the loading end of the transportation conveyor are traveling. By this arrangement, persons will be transferred from one conveyor to the other without physical effort or skill of said persons.

People may step on belts 20 of the loading end of conveyor 10 from a platform, not shown, and since the belts at the loading end of conveyor 10 are traveling at a speed of one mile per hour, no danger is involved. A person stepping on conveyor 10 as just described will be conveyed toward the discharge end of the conveyor at a uniform acceleration speed and from one said series of belts 20 to the next successive series. In the present example, the driving mechanism is designed to give each succeeding drum as 21, 22, 23 an increased surface speed of one mile per hour. Accordingly, to deliver a person at the discharge end of conveyor 10 at a speed of 15 miles per hour, thirteen series of belts 20 are used. Obviously, the acceleration and number of series of belts 20 may be increased or decreased as found desirable.

It will now be seen that applicant has provided safe, practical and relatively inexpensive means for loading persons onto a rapidly moving transportation belt. It will be manifest that the belts 20 decelerate in their travel from drum 22 to drum 21 at a rate corresponding to the acceleration of these belts 20 in their travel from drum 21 to 23. It is the gradual increase and decrease of travel characteristic of applicant's conveying mechanism that constitutes the principal feature of his conveying invention. To unload people from said transport conveyor, a loading conveyor as 10 is aligned with the discharge end of the transport conveyor as described above except the series of belts 20 and their drives are reversed so that belts 20 will be traveling 15 miles per hour adjacent the discharge end of the transport conveyor and each series of belts 20 will decelerate one mile per hour toward the discharge end of the unloading conveyor. Thus thirteen such series decelerating one mile per hour will deliver people at discharge end at one mile per hour at which speed they can safely step off the conveyor.

Belts 20 as shown in Fig. 6 are composed of all rubber or rubber-like material. However, applicant has found that belts 20 may be constructed of a combination of rubber and stress members such as, for example, cotton, nylon or rayon cords as shown in Figs. 13 and 14, wherein 80 is one of a plurality of parallel cords extending the length of a belt 20. When the belt is in its unstretched condition as shown in Fig. 13, the cords 80 follow a sinuous path in a plane parallel to the surface of the belt. It is to be understood, however, that the path followed by the cords may be parallel to the surface of the belt in which the cords are disposed. When said cord reinforcement is employed the cords 80 permit the belts 20 to stretch until the cords are straightened, see Fig. 14, at which point the cords resist further stretch of the belts, accordingly when belts 20 having said cord reinforce as just explained are substituted for those without the cords only the last drum 37 in conveyor 10 would be driven at a surface speed of 15 miles per hour and the amount of stretch of belts 20 permitted by said cords designed to cause the next preceding drum 40 to be driven by the belts common to drums 37 and 40 at a surface speed of one mile less per hour, namely, 14 miles per hour. In similar manner, each succeeding drum has a speed of one mile per hour less than its next preceding drum. This result is made possible by the elastic characteristics of the rubber in which cords 80 are embedded. The extent of belt between drum 37 and 40 that is traveling from drum 40 to 37 is being stretched to the extent permitted by cords 80 and that the extent of these belts traveling from drum 40 to 37 is shrinking so that it reaches drum 40 in the belt's original unstretched condition. Drum 40 will drive drum 11 and drum 12 by belts 20 at the same reduced speeds as just explained relative to drums 37 and 40. It will now be seen that by driving drum 37 at a surface speed of 15 miles per hour and employing thirteen series of belts in a loading conveyor 10 using belts with the cords 80 that the surface speed of belts 20 on drum 21 will be one mile per hour.

The cords 80 shown in Fig. 13 may be embedded between layers 13 and 14 of unvulcanized rubber of proper thickness and width, said strips being cold-pressed to form the desired successive cogs on one face of each layer. Next one so formed may be placed about a building drum or form of proper length and the strip's ends spliced with the cogs facing outwardly. Next a cord 80 may be spirally wound a number of turns loosely about the strip on the drum or building form after which the other strip is laid over the cords so that the cog surfaces of the strips mesh with said cord therebetween which imparts the sinuous course the cord follows. The end of said second layer is next spliced and the assembly of layers 13 and 14 and cord 80 vulcanized in a proper mold to form a belt 20. It will be seen that because of the substantial length of belts 20 that the spirals of cord 60 are substantially parallel.

While conveyor 10 has been illustrated in connection with loading and unloading people on and off a relatively fast moving transportation conveyor, it is to be understood that it is also useful for loading such materials as coal onto a conveyor belt, or materials in a factory production, or wherever variable speeds are desirable in handling materials on a conveyor. One particular important advantage of applicant's gradual acceleration of speed of a conveyor belt is that it makes possible loading heavy objects on a slow moving belt, accelerating that belt's speed and delivering the object onto a fast moving belt at the approximate speed of said latter belt and thereby avoid subjecting the belts to the strain of suddenly starting the heavy object from zero speed to the speed of the fast moving conveyor. Obviously, applicant's conveyor described hereinabove makes possible an ideal control of belt speed from faster to slower, to faster as the operations in a particular factory production line require, and it is to be understood that applicant contemplates such use of his invention.

Another field in which the present invention is useful is in simultaneously conveying and uniformly stretching films or sheets of rubber hydrochloride and other thermostretchable elastoplastic films, such as, for example, but without limitation, polyvinyl alcohol, nylon, etc. Such an embodiment of the invention is illustrated in Figs. 10, 11, 12, 15, 16, 17, 18 and 19 as will now be explained in reference to the commercially available transparent, colored or opaque rubber hydrochloride film being made by the process described in the Calvert Patent Number 1,989,632. Such films are usually about .001 inch in thickness but thinner or considerably thicker gauge film will be satisfactory for the present operation. The difficulty of stretching such films as set out in said Calvert Patent No. 1,989,632 is discussed at length in the first column of the R. C. Martin Patent Number 2,328,827 to which reference is made. Extremely thin films as for example .00075 to .0015 inch in thickness heretofore have been extremely difficult to stretch uniformly when heated, due to the fact that such films, when cast or calendered, are not uniform in thickness and when pulled, as by tentering devices, the thin areas localize the stretch. The present invention solves this problem by sandwiching the film to be stretched between two moving belts that are elastic and simultaneously stretch said belts in all directions imparting a corresponding stretch to the said film regardless of thin or tough areas that may be in the film. It is believed that applicant's method of stretching, now to be described in detail, has a slight but important molding effect on the film which results in a leveling off of the thick spots and filling in the thin ones.

Figure 11:
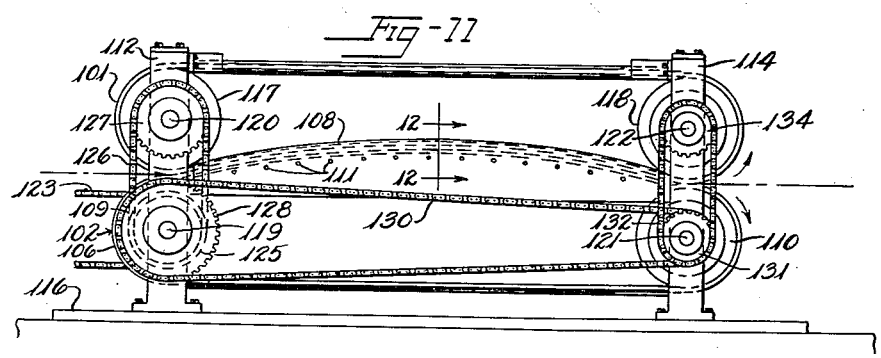
Fig. 11 is a side elevation of the apparatus of Fig. 10.

Referring particularly to Figs. 10, 11 and 12, a sheet of film 100 to be stretched is led into the bite between two driven belts 101 and 102. Film 100 is heated by being passed over suitable heating rolls, not shown, just prior to the film's entrance between 101 and 102 as is well understood in the art. In the case of rubber hydrochloride film, it is heated to approximately 200° F. at time of stretching and is delivered from the heating rolls to belts 101 and 102 at the same speed these belts are traveling at the first point of contact of the film with the belts. From this point until the film emerges from between the belts said belts grip the film therebetween.

Belts 101 and 102 are composed of elastic material such as rubber and are molded with beaded edges 103, 104 and 105, 106 respectively. These edges are adapted to slide in the grooves of substantially C-shaped diverging rigid guide members 107 and 108. Belts 101 and 102 when composed of rubber are preferably approximately ³⁄₁₆ inch thick and the beads of sufficient thickness and shape to readily slide in said C guides. Applicant has found that by lubricating said guides with graphite that the belt edges slide in the guides without objectionable friction. It is to be understood, however, that the invention contemplates antifriction constructions for said guide channels, such as, for example, a series of roller bearings against which the edges 103, 104, 105 and 106 would run.

Belt 102 runs over driven drums 109 and 110 from drum 109 over a series of horizontal idler rollers 111 to drum 110. Rollers 111 are disposed in an arcuate path and are supported in suitable bearings in a side frame, the last mentioned bearing and side frame not being shown but are of a type common in mechanical devices and therefore a detailed description of them is considered to be unnecessary. As will be seen by reference to the Figs. 10 and 11, drums 109 and 110 are supported on upright members 112, 113 and 114, 115 respectively, bolted to a base 116. Belt 101 is mounted on driven drums 117 and 118 and travels from the bottom of drum 117 to the bottom of drum 118 normally in contact with belt 102. Members 107 and 108 are arranged to provide continuous diverging guides for said edges of the belts from just adjacent drums 109, 117 to adjacent drums 110 and 118 as will be seen by reference to Fig. 10.

Drums 109, 117, 110, 118 are supported on shafts 119, 120, 121, 122 respectively and are driven indirectly by sprocket chain 123 connected to a suitable source of power, not shown, and to a sprocket wheel 124 mounted on shaft 119. Shaft 119 rotates drum 109 and has mounted in driving relation therewith sprocket wheel 125 carrying sprocket chain 126 running from wheel 125 to a sprocket wheel 127 mounted on and driving shaft 120 which latter shaft drives drum 117. A sprocket wheel 128 is driven by shaft 119 and a smaller sprocket wheel 129 on shaft 121 is driven by a sprocket chain 130 mounted on said wheels 128 and 129. Drum 110 is driven by wheel 129 through shaft 121. Drum 118 is driven by shaft 122 by a sprocket wheel 131 and a sprocket chain 132 mounted on wheels 131 and 134.

It will now be seen that the sheet of film 100 will be drawn between and advanced with belts 101 and 102 with the weight of belt 101 over the film pressing the film against the surface of these latter belts. The guide members 107 and 108 receive the beaded edges 103, 105 and 104, 106 respectively and lead the edges of belts 101 and 102 progressively laterally outwardly as these belts run from between drums 109, 117 to between drums 110, 118 which results in a continuous gradual progressive stretch of the surface of belts 101 and 102 during their progress from drums 109, 117 to drums 110, 118. Referring now to the sprocket drives of these last mentioned drums, it is to be understood that drums 109 and 117 are driven at the same surface speed and that drums 110 and 118 are driven at the same surface speeds, but that the surface speed of drums 110 and 118 is faster than that of drums 109 and 117 resulting in stretching belts 101 and 102 longitudinally as they progress from drums 109, 117 to drums 110, 118. Said lateral and longitudinal stretch of said belts occur simultaneously. The strip of film 100 being heated as explained and made readily stretchable has imparted to it the same stretch, both in amount and condition of stretching, as the stretch to which belts 101 and 102 are subjected. This stretching of the film results from its frictional contact with the surfaces of belts 101 and 102. The stretching movement of the surface of these latter belts pressed firmly against the softened and easily stretched film is mechanically quite different from prior type methods of stretching said films in that the portion of film being stretched is grasped over its entire surface between two expanding surfaces that impart to the film the same expansion to which said expanding surfaces are subjected.

Since the belts 101 and 102 are of substantial thickness and preferably molded, their stretch is substantially free of the localized stretch that has heretofore resulted in the extremely thin, soft film of irregular thickness.

The amount of stretch given film 100 may be as much as desired being limited only by the rupturing point of the film. The apparatus shown in Fig. 10 is adapted to stretch film approximately 60% in all directions. Obviously, this particular stretch could be substantially increased or decreased on a single unit similar to Fig. 10; however, if extreme stretches are desired, the film 100 may pass from one unit as shown in Fig. 10 directly into a second and a third etc. of larger but similar stretching units until the maximum stretch the film will stand is reached. The temperature of the film may be maintained in its travel through additional units by passing over heated rolls interposed between the additional stretching units, or by passing the film through heated chambers, or by any method found satisfactory. If the sheet of film 100 is substantially narrower than belts 101 and 102 it will be stretched in the same manner as the strip 100 which is illustrated as being of approximately the same width as the unstretched width of belts 101 and 102. These narrower sheets may be run through the apparatus of Fig. 10 and cooled and rolled on a drum and then reheated and again passed through the stretching apparatus until the desired stretch of the film has been obtained.

Referring again to Figs. 10, 11 and 12 guides 107a and 108a of the same construction as guides 107 and 108 are employed to guide edges 103, 104 and 105, 106 in their return courses to drums 117 and 109 respectively. Said guides are disposed relative to said drums so that the beaded edges of the belts will enter the guides regardless of the direction belts 101 and 102 are run.

After sheet 100 has been cooled, in any manner found satisfactory, it is rolled on a shell or drum for storage or handling in a further operation of the present invention which will now be described. In this further operation, the apparatus shown in Figs. 10, 11 and 12 is run in reverse to that described above and the stretched and cooled sheet 100 is run back through the apparatus whereby it is subjected to compression forces in all directions in the plane of said sheet. As the belts 101 and 102 travel from drums 118 and 110 to drums 117 and 109 respectively, they progressively shrink in the reverse manner that they were stretched when traveling in the opposite direction due to the elastic characteristic of the belts such shrinking would normally leave the surface of the belts smooth and unwrinkled. The cold sheet of film 100 sandwiched and gripped between said shrinking belts are incapable of comparable shrinkage of said belts and accordingly are forced into numerous small wrinkles 140. Since the wrinkling force is applied from all directions in the plane of the surface of sheet 100, the wrinkles form no pattern and sheet 100 emerges from between said belts at drums 117 and 109 in such wrinkled form that the sheet is extensible in all directions without stretching. In effect, the sheet 100 wrinkled as just explained provides a wrinkled or crimped sheet adapted for wrapping or packaging purposes but differing in the structure of its wrinkling or crimping from crimped papers and the like heretofore known, in that the wrinkles of sheet 100 extend in all directions, whereas the crimps or wrinkles of the prior art extend in one direction only. The wrinkles of sheet 100 are illustrated in Figs. 15, 16 and 17 and the use of such sheet or material for packaging is illustrated in Figs. 18 and 19 to which reference is now made.

In Fig. 18 an irregularly shaped object 150, such as a potato is wrapped in wrinkled film 100a such as wrinkled sheet 100. Preferably the film is drawn snugly about the object 150 which can be done since the wrinkles 140 will straighten out permitting the film to form about the object being wrapped as though the film was stretchable. Applicant has found that the film wrinkled as explained can be wrapped about a sphere such as a round ball without causing additional wrinkles in the film, which is impossible with prior art non-stretchable films. In the case of the odd shaped object 150, applicant draws the film 100a thereabout snugly and gathers the edge 151 about a removable air-escape tube 152, after which a flow of hot air from any suitable source is directed onto the film 100a which, as will be understood by those familiar with the art, will cause film 100a to shrink and this results in the straightening out of all wrinkles 140 presenting a smooth wrap about object 150. Next, if desired, the escape tube 152 may be connected with a suitable vacuum line whereby the air between object 150 and film 100a is exhausted and the film drawn into close association with the object after which tube 152 may be partially removed and film 100a crimped and heat sealed as illustrated at 153, Fig. 19. This heat sealing may be accomplished by any type of heated pressure members or heat may be omitted and a sealant of suitable type may be applied to the edge portions of sheet 100a which will make a satisfactory seal when the sealant is pressed together as at 153 referred to above. After sealing at 153, tube 152 is removed.

Another embodiment of the invention is illustrated in Figs. 7, 8 and 9 wherein a plurality of molded stretchable endless V belts 201 and 202 run in sheaves on drums 209, 217, 210 and 218 as substitutes for belts 101 and 102 and drums 109, 117, 110 and 118 respectively. Belts 201 run from the top of drum 217 to the top of drum 218 in a converging direction and in like manner belts 202 run from drum 209 to drum 210. Magnets 203 are molded into belts 201 with an arcuate surface exposed and preferably extending a slight distance beyond the surface of the belts in which they are disposed. Magnets 203 are spaced at short uniform distances longitudinally of the belts 201 when the belts are molded. Belts 202 are provided with magnets 204 in the same manner and disposition as magnets 203 in belts 201. The magnets 203 are oppositely charged to magnets 204 and these magnets are so disposed in belts 201 and 202 which belts are so disposed relative to each other that their magnets normally contact the correspondingly disposed magnet of the opposite belt as shown in Fig. 9.

Belts 201 and 202 are subjected to divergence which corresponds to the lateral stretch of belts 101 and 102 and likewise to the same longitudinal stretch. The sheet of film 100 is fed into the bite between belts 201 and 202 in the same condition and manner as described hereinabove relative to Fig. 10. The sheet 100 is gripped between magnets 203 and 204 and as belts 201 and 202 advance to drums 218 and 210 respectively, the sheet 100 is stretched between the gripping points of said magnets imparting a stretch to sheet 100 similar to the stretch imparted by the apparatus of Fig. 10 heretofore explained. The stretching operation of film 100 by the means of Figs. 7, 8 and 9 will be clearly understood by reference to the explanation of the operation of belts 101 and 102 in stretching sheet 100 and therefore further detailed description is unnecessary.

It will now be apparent that the stretching and wrinkling apparatus and method may be employed for repeated passes of stretched or wrinkled material. Thus the stretch may be increased or additional wrinkling effected. Or the invention may be employed to wrinkle such materials as foils or paper. For example, presently crepe paper is wrinkled in one direction only but if such creped paper was passed through applicant's apparatus so as to crowd the paper from all directions, it would become stretchable in all directions which would add to its usefulness in may wrapping operations.

The detailed description of the particular embodiments of the invention illustrated and described herein is not to be construed as limiting the invention thereto. The invention includes all features of patentable novelty residing in the foregoing description and the accompanying drawings.

I claim:

1. A conveyor belt adapted to gradually decrease its initial speed comprising, a plurality of driven pulley drums having parallel axes and being spaced at predetermined intervals along said belt, a series of endless narrow stretchable elastic V belts mounted on and extending from each said drum to the next successive drum only, the drums which are intermediate the end drums of said plurality of drums being common to belts of the next successive series of endless belts, said endless belts being closely spaced laterally of said conveyor, said endless belts of adjacent said series being disposed on their common drums in alternate relation so as to provide a continuous conveying surface, means for driving each successive drum at a decreased surface speed whereby each series of endless belts gradually decreases its speed from one drum to another and the endless belts have the same speed on their common drums.

2. A conveyor belt adapted to gradually increase its initial speed comprising, a plurality of driven pulley drums having parallel axes and being spaced at predetermined intervals along said belt, a series of endless narrow stretchable elastic V belts mounted on and extending from each said drum to the next successive drum only, the drums which are intermediate the end drums of said plurality of drums being common to belts of the next successive series of endless belts, said endless belts being spaced laterally of said conveyor a distance that provides adequate support for persons standing on the endless belts; said endless belts of adjacent series being disposed on their common drums in alternate relation so as to provide a continuous conveying surface, means for driving each successive drum at an increased surface speed whereby each series of endless belts gradually increases its speed from one drum to another and the endless belts have the same speed on their common drums.

3. Conveyor means including spaced driven pulleys, a plurality of elastic belts mounted in parallel relation on and driven by said pulleys to provide an upwardly facing load supporting surface, said pulleys being spaced apart a sufficient distance to impart suitable driving tension between said belts and said pulleys, means independent of said belts for driving said pulleys at surface speeds differing a predetemined amount from each other whereby said belts are stretched a predetermined amount in their course from one pulley to the other and substantially unstretched in the return course.

4. Conveyor means including a pair of spaced driven pulleys mounted to be rotatable about parallel axes, a plurality of elastic belts engaged with said pulleys to be driven thereby and parallel to one another to provide an upwardly facing load supporting surface, said pulleys being spaced apart a sufficient distance to impart suitable driving tension between said belts and said pulleys, means independent of said belts for rotating said pulleys about their respective axes at surface speeds differing a predetermined amount from each other whereby said belts are stretched a predetermined amount in their course from one pulley to the other and substantially unstretched in the return course.

References Cited in the file of this patent

UNITED STATES PATENTS

| | | |
|---|---|---|
| 564,340 | Reed | July 21, 1896 |
| 1,671,207 | Parlongue | May 29, 1928 |
| 1,689,201 | Halter | Oct. 30, 1928 |
| 2,160,367 | Maxfield | May 30, 1939 |
| 2,415,387 | Graebner | Feb. 4, 1947 |
| 2,434,617 | Hoppe | Jan. 13, 1948 |
| 2,512,367 | Nicolle | June 20, 1950 |
| 2,514,028 | Cloud | July 4, 1950 |
| 2,683,523 | Rottersman | July 13, 1954 |